United States Patent
Matsuoka et al.

(10) Patent No.: US 6,245,398 B1
(45) Date of Patent: Jun. 12, 2001

(54) OPTICALLY ANISOTROPIC SHEET CONTAINING DISCOTIC LIQUID CRYSTAL MOLECULES TWISTED WITH OPTICALLY ACTIVE TRIPHENYLENE COMPOUND

(75) Inventors: Koushin Matsuoka; Ken Kawata; Shigeki Yokoyama, all of Minami-ashigara (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 0 days.

(21) Appl. No.: 09/523,651

(22) Filed: Mar. 10, 2000

(30) Foreign Application Priority Data

Mar. 29, 1999 (JP) .................................................. 11-087142

(51) Int. Cl.$^7$ ................................................. G02F 1/1335
(52) U.S. Cl. ........................... 428/1.3; 349/117; 349/121; 558/271; 558/265
(58) Field of Search ............................... 428/1.3; 349/117, 349/121; 558/271, 265

(56) References Cited

FOREIGN PATENT DOCUMENTS 9-301906 * 11/1997 (JP) .

\* cited by examiner

Primary Examiner—Alexander S. Thomas
(74) Attorney, Agent, or Firm—Burns, Doane, Swecker & Mathis, LLP

(57) ABSTRACT

An optically active triphenylene compound is represented by the formula (I).

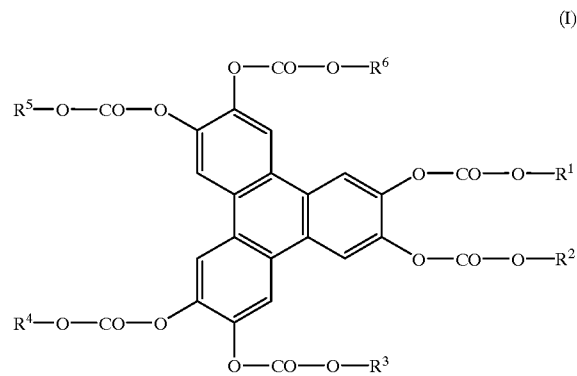

In the formula (I), $R^1$, $R^2$, $R^3$, $R^4$, $R^5$ and $R^6$ is independently an optically active monovalent group. The optically active triphenylene compound can be advantageously used as a chiral agent in an optically anisotropic sheet or a liquid crystal display of an STN mode.

14 Claims, 5 Drawing Sheets

(a)

(b)

(c)

(d)

(e)

OPTICALLY ANISOTROPIC SHEET CONTAINING DISCOTIC LIQUID CRYSTAL MOLECULES TWISTED WITH OPTICALLY ACTIVE TRIPHENYLENE COMPOUND

FIELD OF THE INVENTION

The present invention relates to an optically anisotropic sheet containing discotic liquid crystal molecules twisted with an optically active compound. The invention also relates to a liquid crystal display of an STN mode and an optically active triphenylene compound.

BACKGROUND OF THE INVENTION

A liquid crystal display of an STN mode comprises a liquid crystal cell of an STN (Super Twisted Nematic) mode, two polarizing elements placed on both sides of the liquid crystal cell, and one or two optical compensatory sheets (phase retarders) placed between the liquid crystal cell and the polarizing element.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecule. Each of the substrates has an orientation layer, which has a function of aligning the rod-like liquid crystal molecules. The rod-like liquid crystal molecules are twisted by using a chiral agent. A twist angle of the molecules is in the range of 180° to 360°.

Without an optical compensatory sheet, a liquid crystal display of an STN mode gives an image colored blue or yellow because of birefringence of rod-like liquid crystal molecules. The blue or yellow color is inconvenient for not only a black and white image but also a color image. An optical compensatory sheet has a function of removing color from an image to display a bright and clear image. The optical compensatory sheet also has a function of enlarging a viewing angle of a liquid crystal cell. As the optical compensatory sheet, a stretched birefringent film has been usually used. Japanese Patent Provisional Publication Nos. 7(1995)-104284 and 7(1995)-13021 disclose an optical compensatory sheet made of a stretched birefringent film for a liquid crystal display of an STN mode.

In place of the stretched birefringent film, an optically anisotropic sheet comprising an optically anisotropic layer on a transparent substrate has been proposed as an optical compensatory sheet. The optically anisotropic layer is formed by aligning discotic liquid crystal molecules and fixing the aligned molecules. The discotic liquid crystal molecules usually have large birefringence, and they also have various alignment forms. Accordingly, an optical compensatory sheet obtained by using the discotic liquid crystal molecule has a specific optical characteristic that cannot be obtained by the conventional stretched birefringent film. The optical compensatory sheet using the discotic liquid crystal molecule is disclosed in Japanese Patent Provisional Publication No. 6(1994)-214116, U.S. Pat. Nos. 5,583,679, 5,646, 703 and German Patent Publication No. 3,911,620A1. However, the disclosed optical compensatory sheet is designed to be used in a liquid crystal display of a TN (Twisted Nematic) mode.

The optical compensatory sheet containing the discotic liquid crystal molecules should be redesigned to be used in a liquid crystal display of an STN mode. In a liquid crystal cell of the STN mode, rod-like liquid crystal molecules are aligned according to a super twisted birefringent mode at a twist angle of larger than 900. The liquid crystal display of the STN mode can give a clear image with a large capacity according to a time-sharing addressing method even though the display has a simple matrix electrode structure (having no active matrix such as a thin film transistor or a diode).

The discotic liquid crystal molecules should be oriented in twisted alignment at an average twist angle of 90° to 360° to optically compensate the liquid crystal cell of the STN mode. The oriented molecules form a chiral discotic phase, which is preferably a chiral discotic nematic (Np*) phase.

Further, the discotic liquid crystal molecules are preferably aligned at an average inclined angle of 50° to 90°. Japanese Patent Provisional Publication No. 9(1997)-26572 discloses an optical compensatory sheet in which discotic liquid crystal molecules are twisted. The drawings of Japanese Patent Provisional Publication No. 9(1997)-26572 further illustrate those discotic liquid crystal molecules are essentially vertically aligned.

SUMMARY OF THE INVENTION

It is technically difficult to align discotic liquid crystal molecules uniformly (i.e., to orient the molecules in monodomain alignment) from the interface facing an orientation layer to the opposite interface facing the air, according to the disclosures of Japanese Patent Provisional Publication No. 9(1997)-26572.

For orienting the discotic liquid crystal molecules in twisted alignment, an optically active compound is used as a chiral agent. Japanese Patent Provisional Publication No. 9(1997)-26572 discloses a discotic liquid crystal compound having asymmetric carbon, which works as a chiral agent.

An object of the present invention is to provide an optical compensatory sheet particularly suitable for a liquid crystal display of an STN mode.

Another object of the invention is to provide an optically anisotropic sheet in which discotic liquid crystal molecules are oriented uniformly (in stable monodomain alignment) in twisted alignment.

A further object of the invention is to provide a liquid crystal display of an STN mode that can display a clear image with a high contrast, in which blue or yellow color caused by birefringence is reduced.

A furthermore object of the invention is to provide a new optically active triphenylene compound.

The present invention provides an optically anisotropic sheet which comprises a transparent substrate and an optically anisotropic layer, said optically anisotropic layer comprising discotic liquid crystal molecules, and said discotic liquid crystal molecules being oriented in twisted alignment, wherein the optically anisotropic layer further contains an optically active triphenylene compound represented by the formula (I):

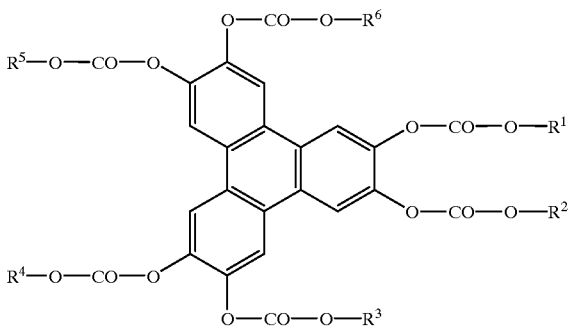

(I)

in which each of $R^1$, $R^2$, $R^3$, $R^4$, $R^5$ and $R^6$ is independently an optically active monovalent group.

The invention also provides a liquid crystal display of an STN mode comprising a liquid crystal cell of an STN mode, two polarizing elements placed on both sides of the liquid crystal cell, and one or two optical compensatory sheets placed between the liquid crystal cell and one or both of the polarizing elements, wherein the optical compensatory sheet comprises a transparent substrate and an optically anisotropic layer comprising discotic liquid crystal molecules in this order from the side of the polarizing element, said discotic liquid crystal molecules being oriented in twisted alignment at a twist angle of 90° to 360°, and said optically anisotropic layer further containing an optically active triphenylene compound represented by the formula (I).

The invention further provides an optically active triphenylene compound represented by the formula (II):

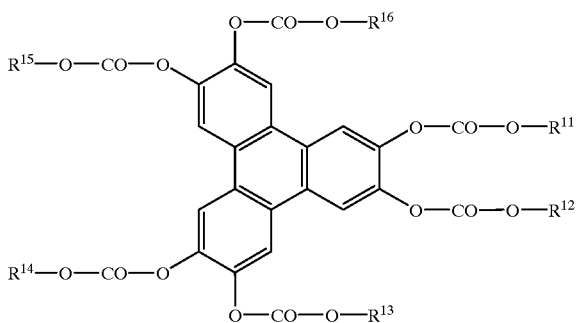

(II)

in which each of $R^{11}$, $R^{12}$, $R^{13}$, $R^{14}$, $R^{15}$ and $R^{16}$ is independently an alkyl group having 4 to 40 carbon atoms or a cycloalkyl group having 4 to 40 carbon atoms, said carbon atoms including at least one asymmetric carbon atom.

In the present specification, the term "average inclined angle" means an average of angles between discotic planes of discotic liquid crystal molecules and a surface of a transparent substrate (or a surface of an orientation layer). The present specification refers to alignment of liquid crystal molecules at an average inclined angle in the range of 50° to 90° as essentially vertical alignment of the molecules.

The applicants have found that the optically active triphenylene compound represented by the formula (I) works as an excellent chiral agent for discotic liquid crystal molecules. A triphenylene compound itself is a discotic liquid crystal compound. In the present invention, the triphenylene compound of the formula (I) is used as a chiral agent, while another discotic liquid crystal compound is used in the optically anisotropic layer. The discotic liquid crystal molecules are oriented uniformly in stable twisted alignment by the function of the triphenylene compound.

Since the discotic liquid crystal molecules are thus oriented uniformly in twisted alignment, an optical compensatory sheet suitable for a liquid crystal display of an STN mode is obtained. This optical compensatory sheet (in which the discotic liquid crystal molecules are oriented in twisted alignment, and preferably in essentially vertical alignment) reduces coloring caused by birefringence, and hence enables a liquid crystal display of an STN mode to display a clear image with a high contrast.

DETAILED DESCRIPTION OF THE INVENTION

Figure 1:
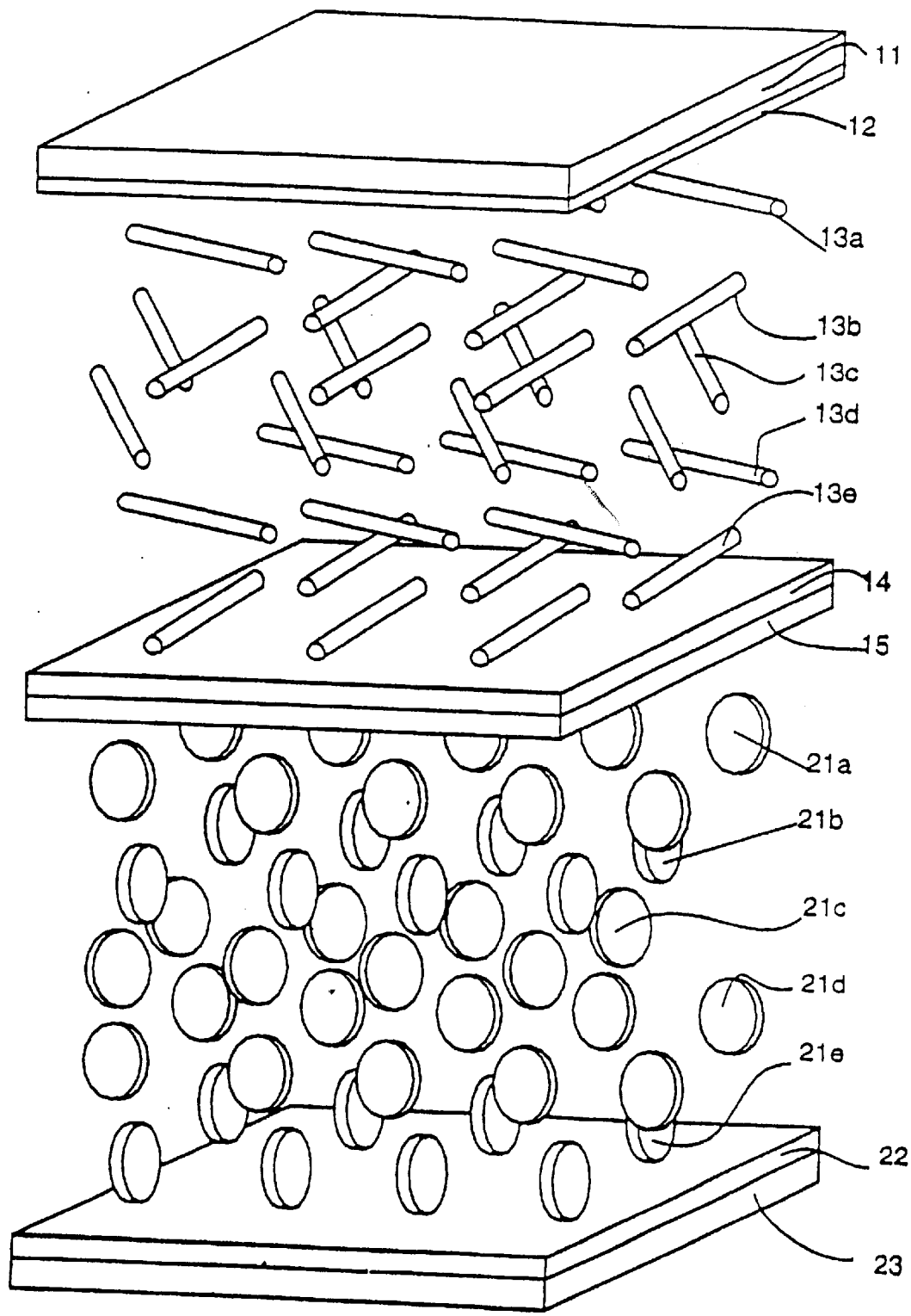
FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

As is shown in FIG. 1, a liquid crystal cell (11 to 15) comprises an upper substrate (11) having an upper orientation layer (12), a lower substrate (15) having a lower orientation layer (14) and a liquid crystal layer comprising rod-like liquid crystal molecules (13a to 13e) sealed between the orientation layers (12 & 14). The rod-like liquid crystal molecules (13a to 13e) are aligned by functions of the orientation layers (12 & 14), and are twisted by a function of a chiral agent contained in the liquid crystal layer.

Each of the upper substrate (11) and the lower substrate (15) has an electrode (not shown), which has a function of applying voltage to the rod-like liquid crystal molecules (13a to 13e).

When voltage is not applied to the liquid crystal cell of an STN mode (off), the rod-like liquid crystal molecules (13a to 13e) are essentially horizontally aligned parallel to the surface of the orientation layers (12 & 14), as is shown in FIG. 1. The rod-like liquid crystal molecules (13a to 13e) are twisted along a thickness direction, and spiral on a plane (counterclockwise about 240° from 13a to 13e in FIG. 1).

When voltage is applied to the liquid crystal cell of an STN mode (on), rod-like liquid crystal molecules placed in the middle of the cell (13b to 13d) are rather vertically aligned (realigned parallel to a direction of an electric field), compared with FIG. 1 (off). On the other hand, the alignment of the other rod-like liquid crystal molecules (13a, 13e) neighboring the orientation layers (12, 14) is not essentially changed after applying voltage to the cell.

An optical compensatory sheet is provided under the liquid crystal cell. The optical compensatory sheet shown in FIG. 1 comprises a transparent substrate (23), an orientation layer (22) and an optically anisotropic layer in order. The optically anisotropic layer is formed by aligning discotic liquid crystal molecules (21a to 21e) and fixing the molecules while the alignment is maintained.

As is shown in FIG. 1, discotic liquid crystal molecules (21a to 21e) are so aligned that discotic planes of the molecules are essentially perpendicular to a surface of the orientation layer (22). The discotic liquid crystal molecules (21a to 21e) are preferably twisted along a thickness direction, and spiral on a plane (clockwise about 240° from 21a to 21e in FIG. 1).

In FIG. 1, alignment of each of the rod-like liquid crystal molecules corresponds to alignment of each of the discotic liquid crystal molecules, namely 13a to 21e, 13b to 21d, 13c to 21c, 13d to 21b and 13e to 21a. Accordingly, the discotic liquid crystal molecule 21e optically compensates the rod-like liquid crystal molecule 13a, 21d compensates 13b, 21c compensates 13c, 21b compensates 13d, and 21a compensates 13e. The optical relation between the rod-like liquid crystal molecule and the discotic liquid crystal molecule is described below referring to FIG. 2.

Figure 2:
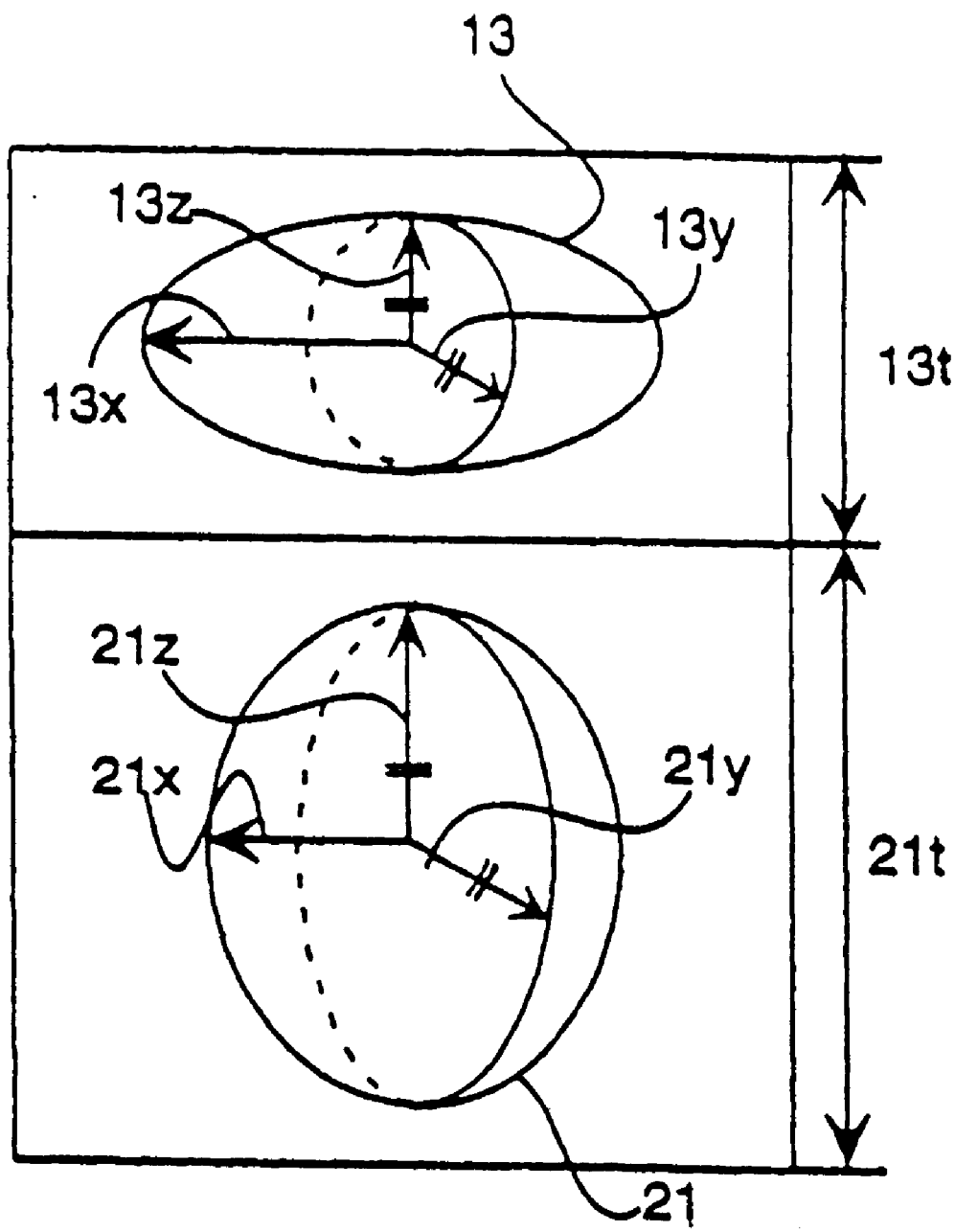
FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

The refractive index ellipsoid (13) of a rod-like liquid crystal molecule in a liquid crystal cell is formed by refractive indices (13x, 13y) in plane parallel to an orientation layer and a refractive index (13z) along a thickness direction. In a liquid crystal cell of an STN mode, the refractive index (13x) along one direction in place is relatively large, while the index (13y) along a direction perpendicular to the direction of (13x) is relatively small. The refractive index (13z) along the thickness direction is also relatively small in a liquid crystal cell of an STN mode. Therefore, the refractive index ellipsoid (13) has a shape like a laid football, as is shown in FIG. 2. The liquid crystal cell having the refractive index ellipsoid (not spherical) shows a birefringence depending on a viewing angle. The dependency on the viewing angle is canceled by an optical compensatory sheet.

The refractive index ellipsoid (21) of a discotic liquid crystal molecule in an optical compensatory sheet is also formed by refractive indices (21x, 21y) in plane parallel to an orientation layer and a refractive index (21z) along a thickness direction. The refractive index (21x) along one direction in place is relatively small, while the index (21y) along a direction perpendicular to the direction of (21x) is relatively large. The refractive index (121z) along the direction is also relatively large. These refractive indices are obtained by aligning a discotic liquid crystal molecule essentially vertically. Therefore, the refractive index ellipsoid (21) has a shape like a standing disk, as is shown in FIG. 2.

A retardation formed in a liquid crystal cell (1) can be compensated by a retardation formed in an optical compensatory sheet (2) because of the above-described relation. The dependency on a viewing angle of the liquid crystal cell can be canceled by adjusting optical characteristics of a rod-like liquid crystal molecule and a discotic liquid crystal molecule that has a director having the same direction as that of the rod-like liquid crystal molecule. In more detail, the dependency on a viewing angle can be canceled by adjusting refractive indices (13x, 13y, 13z) of a rod-like liquid crystal molecule, refractive indices (21x, 21y, 21z) of a discotic liquid crystal molecule, a thickness (13t) of the rod-like liquid crystal molecule layer and a thickness (21t) of the discotic liquid crystal molecule layer according to the following formulas:

$$|(13x-13y)\times 13t|=|(21x-21y)\times 21t|$$

$$|(13x-13z)\times 13t|<=|(21x-21z)\times 21t|.$$

Figure 3:
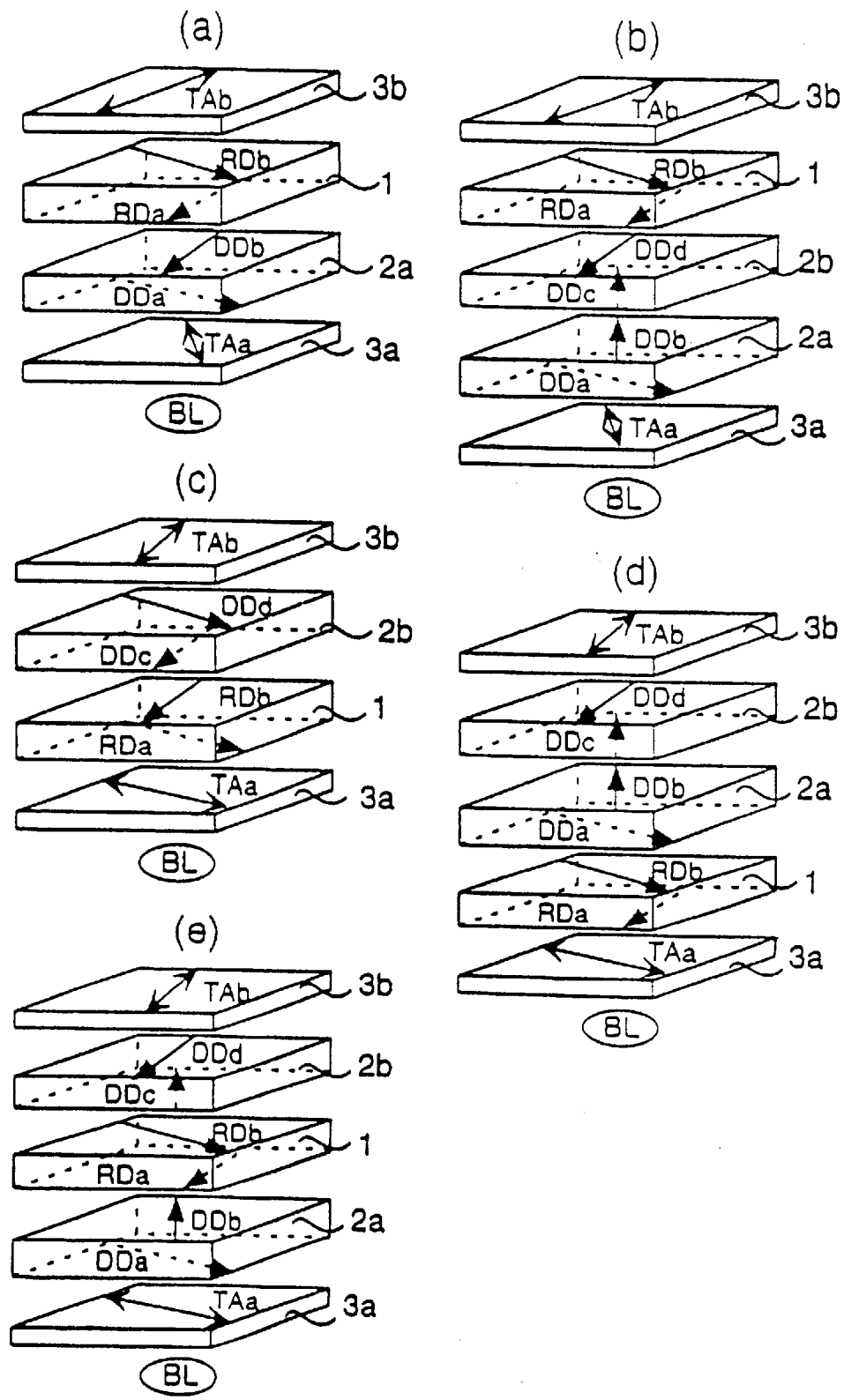
FIGS. 3a–e schematically illustrates a layered structure of a liquid crystal display of an STN mode.

FIG. 3 schematically illustrates a layered structure of a liquid crystal display of an STN mode.

The liquid crystal display shown in FIG. 3(a) comprises a backlight (BL), a lower polarizing element (3a), a lower optical compensatory sheet (2a), a liquid crystal cell of an STN mode (1) and an upper polarizing element (3b) in order.

The liquid crystal display shown in FIG. 3(b) comprises a backlight (BL), a lower polarizing element (3a), a lower optical compensatory sheet (2a), an upper optical compensatory sheet (2b), a liquid crystal cell of an STN mode (1) and an upper polarizing element (3b) in order.

The liquid crystal display shown in FIG. 3(c) comprises a backlight (BL), a lower polarizing element (3a), a liquid crystal cell of an STN mode (1), an upper optical compensatory sheet (2b) and an upper polarizing element (3b) in order.

The liquid crystal display shown in FIG. 3(d) comprises a backlight (BL), a lower polarizing element (3a), a liquid crystal cell of an STN mode (1), a lower optical compensatory sheet (2a), an upper optical compensatory sheet (2b) and an upper polarizing element (3b) in order.

The liquid crystal display shown in FIG. 3(e) comprises a backlight (BL), a lower polarizing element (3a), a lower optical compensatory sheet (2a), a liquid crystal cell of an STN mode (1), an upper optical compensatory sheet (2b) and an upper polarizing element (3b) in order.

FIG. 3 shows arrows indicating the following optical directions.

TAa: Transparent axis (TAa) of a lower polarizing element (3a).

DDa: Normal (director's) direction of a discotic plane of a discotic liquid crystal molecule adjacent to an orientation layer in a lower optical compensatory sheet (2a).

DDb: Normal (director's) direction of a discotic plane of a discotic liquid crystal molecule adjacent to a liquid crystal cell in a lower optical compensatory sheet (2a).

RDa: Rubbing direction of a lower orientation layer of a liquid crystal cell (1).

RDb: Rubbing direction of an upper orientation layer of a liquid crystal cell (1).

DDc: Normal (director's) direction of a discotic plane of a discotic liquid crystal molecule adjacent to a liquid crystal cell in an upper optical compensatory sheet (2b).

DDd: Normal (director's) direction of a discotic plane of a discotic liquid crystal molecule adjacent to an orientation layer in an upper optical compensatory sheet (2b).

TAa: Transparent axis of a lower polarizing element (3a).

TAb: Transparent axis of an upper polarizing element (3b).

The angles between the optical directions are described below referring to FIG. 4 and FIG. 5.

Figure 4:
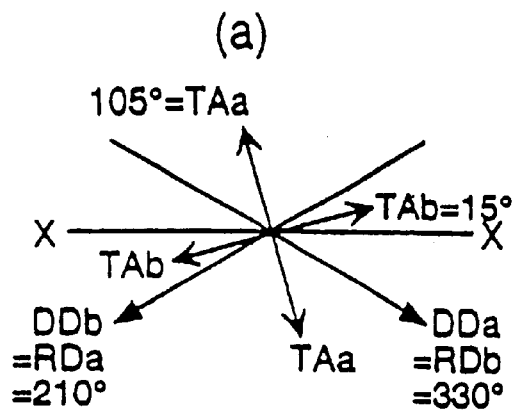
FIGS. 4a–e is a plane view showing preferred optical directions about elements of a liquid crystal display of an STN mode.
Figure 4:
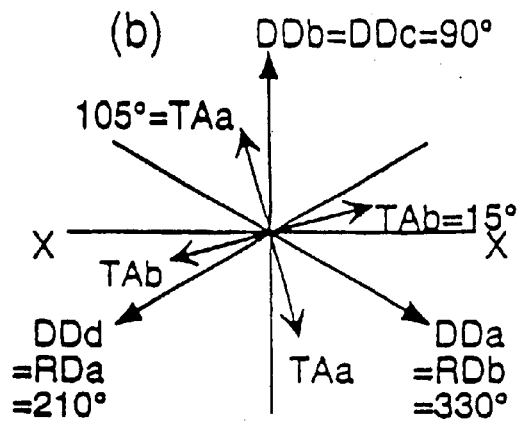
Figure 4:
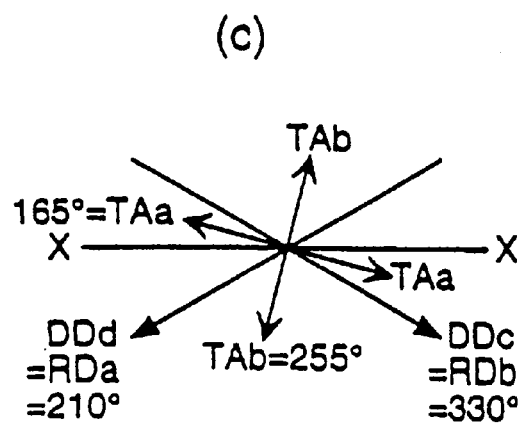
Figure 4:
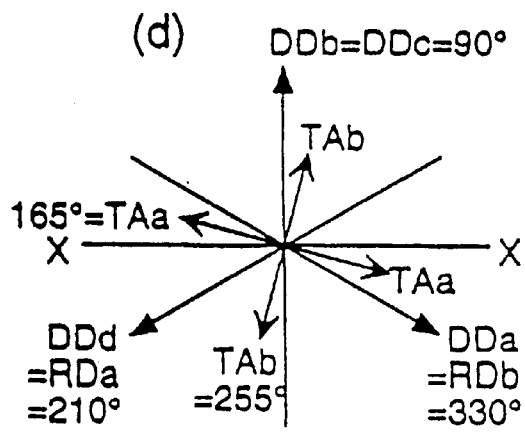
Figure 4:
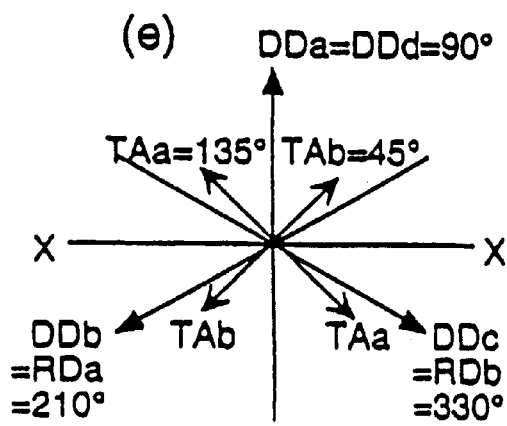

FIG. 4 is a plane view showing preferred optical directions about elements of a liquid crystal display of an STN mode. FIG. 4 shows alignments taking account of a front contrast.

FIG. 4(a) shows preferred optical directions in a liquid crystal display comprising one optical compensatory sheet between a lower polarizing element and a liquid crystal cell of an STN mode, as is shown in FIG. 3(a).

FIG. 4(b) shows preferred optical directions in a liquid crystal display comprising two optical compensatory sheets between a lower polarizing element and a liquid crystal cell of an STN mode, as is shown in FIG. 3(b).

FIG. 4(c) shows preferred optical directions in a liquid crystal display comprising one optical compensatory sheet between a liquid crystal cell of an STN mode and an upper polarizing element, as is shown in FIG. 3(c).

FIG. 4(d) shows preferred optical directions in a liquid crystal display comprising two optical compensatory sheets between a liquid crystal cell of an STN mode and an upper polarizing element, as is shown in FIG. 3(d).

FIG. 4(e) shows preferred optical directions in a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 4, the line (X—X) means a standard direction (0°). The arrows shown in FIG. 4 have the same meanings as is described about FIG. 3. The transparent axis of the lower polarizing element (TAa) and the transparent axis of the upper polarizing element (TAb) can be replaced with each other.

Figure 5:
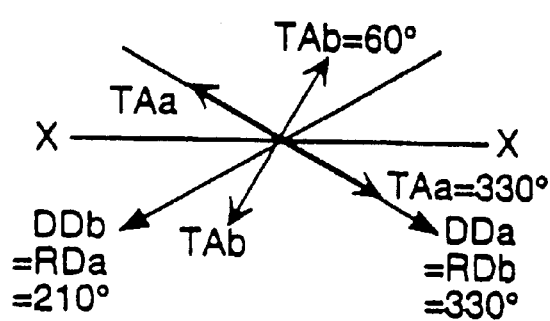
FIGS. 5a–e is a plane view showing other preferred optical directions about elements of a liquid crystal display of an STN mode.
Figure 5:
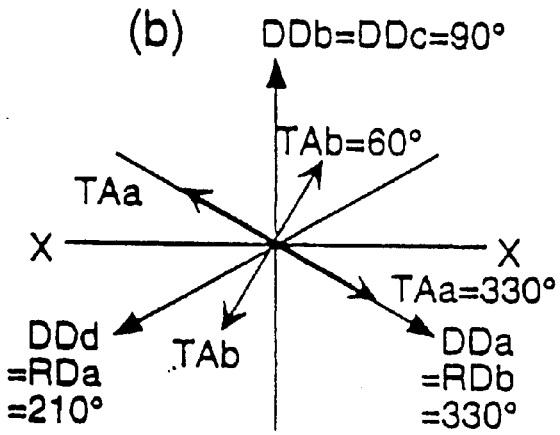
Figure 5:
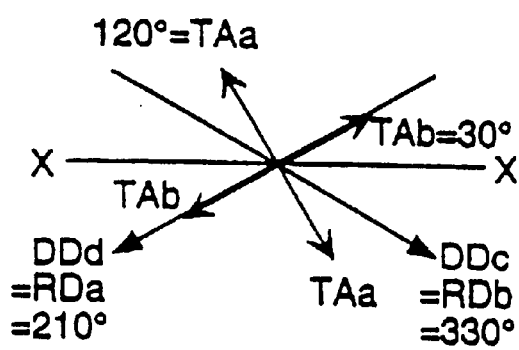
Figure 5:
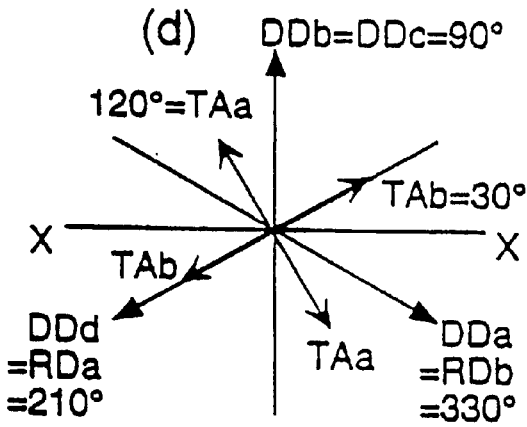
Figure 5:
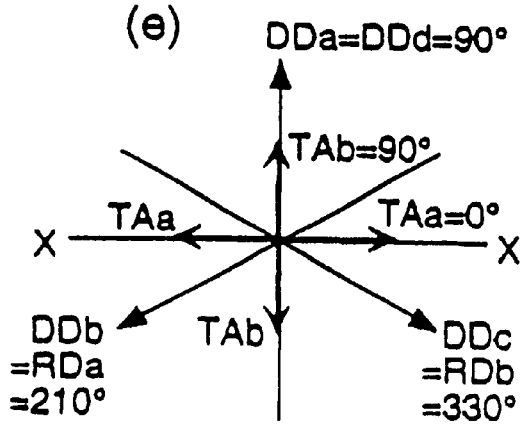

FIG. 5 is a plane view showing other preferred optical directions about elements of a liquid crystal display of an STN mode. FIG. 5 shows alignments taking account of color of a displayed image.

FIG. 5(a) shows preferred optical directions in a liquid crystal display comprising one optical compensatory sheet between a lower polarizing element and a liquid crystal cell of an STN mode, as is shown in FIG. 3(a).

FIG. 5(b) shows preferred optical directions in a liquid crystal display comprising two optical compensatory sheets between a lower polarizing element and a liquid crystal cell of an STN mode, as is shown in FIG. 3(b).

FIG. 5(c) shows preferred optical directions in a liquid crystal display comprising one optical compensatory sheet between a liquid crystal cell of an STN mode and an upper polarizing element, as is shown in FIG. 3(c).

FIG. 5(d) shows preferred optical directions in a liquid crystal display comprising two optical compensatory sheets between a liquid crystal cell of an STN mode and an upper polarizing element, as is shown in FIG. 3(d).

FIG. 5(e) shows preferred optical directions in a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 5, the line (X—X) means a standard direction (0°). The arrows shown in FIG. 5 have the same meanings as is described about FIG. 3. The transparent axis of the lower polarizing element (TAa) and the transparent axis of the upper polarizing element (TAb) can be replaced with each other.

[Transparent Substrate]

A transparent substrate is preferably made of a polymer film, which more preferably is optical isotropic. The term "transparent" means that light transmittance is not less than 80%. The term "optical isotropic" means that a retardation in plane (Re) of the film is not more than 20 nm, preferably not more than 10 nm, and more preferably not more than 5 nm. A retardation along a thickness direction (Rth) of the film is preferably not more than 100 nm, more preferably not more than 50 nm, and most preferably not more than 30 nm. The Re and Rth retardation values are defined by the following formulas:

$$Re = (nx - ny) \times d$$

$$Rth = [\{(nx+ny)/2\} - nz] \times d$$

in which each of nx and ny is a refractive index in plane of the transparent substrate; nz is a refractive index along a thickness direction of the transparent substrate; and d is a thickness of a transparent substrate.

Examples of the polymers include cellulose ester, polycarbonate, polysulfone, polyethersulfone, polyacrylate and polymethacrylate. Cellulose ester is preferred, cellulose acetate is more preferred, and cellulose triacetate is most preferred. The polymer film is formed preferably according to a solvent casting method.

The transparent substrate has a thickness preferably in the range of 20 to 500 μm, and more preferably in the range of 50 to 200 μm.

The transparent substrate can be subjected to a surface treatment (e.g., glow discharge treatment, corona discharge treatment, ultraviolet (UV) treatment, flame treatment) to improve adhesion to a layer formed on the substrate (e.g., adhesive layer, orientation layer, optically anisotropic layer). An adhesive layer (undercoating layer) can be provided on the transparent substrate.

[Orientation Layer]

Discotic liquid crystal molecules can be essentially vertically (homogeneously) aligned by decreasing a surface energy of the orientation layer to erect the liquid crystal molecules. In concrete, a functional group decreasing the surface energy is introduced into the polymer for the orientation layer. A hydrocarbon group containing 10 or more carbon atoms can be effectively used as the functional group. The functional group is preferably introduced into the side chain rather than the main chain of the polymer.

The hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group preferably contains 10 to 100 carbon atoms, more preferably 10 to 60 carbon atoms, and further preferably 10 to 40 carbon atoms.

The main chain of the polymer preferably has a polyimide structure or a polyvinyl alcohol structure.

A polyimide can be generally synthesized by a condensation reaction between a tetracarboxylic acid and a diamine. From plural tetracarboxylic acids or diamines, a polyimide corresponding to a copolymer may be synthesized. The hydrocarbon groups may be placed at the repeating units derived from the tetracarboxylic acid and/or at that derived from the amine.

In the case that the hydrocarbon group is introduced into the polyimide, it is particularly preferred that the main or side chain of the polyimide should have a steroid structure. The steroid structure of the side chain corresponds to the hydrocarbon group containing 10 or more carbon atoms, and essentially vertically (homogeneously) aligns the discotic liquid crystal molecules. In the present specification, the steroid structure means a cyclopentanohydrophenanthrene ring or a ring obtained by replacing a single bond of the cyclopentanohydrophenanthrene ring with a double bond so long as the ring is aliphatic (not forming an aromatic ring).

Also a denatured polyvinyl alcohol having a hydrocarbon group containing 10 or more carbon atoms can align the discotic liquid crystal molecules essentially vertically (homogeneously). The hydrocarbon group may be an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group contains 10 to 100 carbon atoms, preferably 10 to 60 carbon atoms, and more preferably 10 to 40 carbon atoms.

The denatured polyvinyl alcohol having a hydrocarbon group comprises hydrocarbon repeating units preferably in an amount of 2 to 80 mol %, and more preferably in an amount of 3 to 70 mol %. The repeating unit has a hydrocarbon group containing 10 or more carbon atoms.

A preferred denatured polyvinyl alcohol having a hydrocarbon group containing 10 or more carbon atoms is represented by the formula (PV):

$$—(VAl)_x—(HyC)_y—(VAc)_z—\qquad\text{(PV)}$$

in which VAl is a vinyl alcohol repeating unit; HyC is a repeating unit having a hydrocarbon group containing 10 or more carbon atoms; VAc is a vinyl acetate repeating unit; x is 20 to 95 mol % (preferably 25 to 90 mol %); y is 2 to 80 mol % (preferably 3 to 70 mol %); and z is 0 to 30 mol % (preferably 2 to 20 mol %).

Preferred repeating units having a hydrocarbon group containing 10 or more carbon atoms (HyC) are represented by the formulas (HyC-I) and (HyC-II):

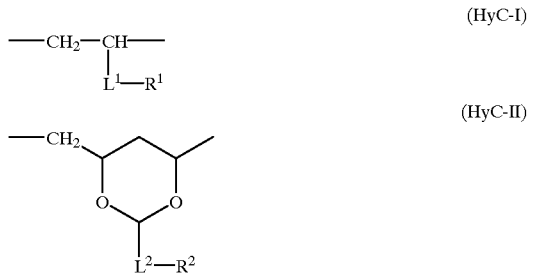

in which $L^1$ is a divalent linking group selected from the group consisting of —O—, —CO—, —SO$_2$—, —NH—, -alkylene-, -arylene- and a combination thereof; $L^2$ is a single bond or a divalent linking group selected from the group consisting of —O—, —CO—, —SO$_2$—, —NH—, -alkylene-, -arylene- and a combination thereof; and each of $R^1$ and $R^2$ is a hydrocarbon group containing 10 or more carbon atoms.

Examples of the divalent linking groups formed by the combinations are shown below.

L1: —O—CO—
L2: —O—CO-alkylene-O—
L3: —O—CO-alkylene-CO—NH—
L4: —O—CO-alkylene-NH—SO$_2$-arylene-O—
L5: -arylene-NH—CO—
L6: -arylene-CO—O—
L7: -arylene-CO—NH—
L8: -arylene-O—
L9: —O—CO—NH-arylene-NH—CO—

The polymer for the orientation layer preferably has a polymerization degree of 200 to 5,000, more preferably 300 to 3,000, and a molecular weight of 9,000 to 200,000, more preferably 13,000 to 130,000. Two or more kinds of the polymers can be used in combination.

The orientation layer is preferably formed by rubbing the polymer. The rubbing treatment can be conducted by rubbing a layer containing the aforementioned polymer with paper or cloth several times along a certain direction.

After essentially vertically (homogeneously) aligning discotic liquid crystal molecules by the orientation layer, the aligned molecules are fixed while the alignment of the liquid crystal molecules is maintained, to form an optically anisotropic layer. The thus formed optically anisotropic layer can be alone transferred (without the orientation layer) onto a polymer film (or a transparent substrate) because the liquid crystal molecules can keep the alignment without the orientation layer. Therefore, the optical compensatory sheet does not need to comprise an orientation layer (though the orientation layer is necessary for preparing the optical compensatory sheet).

[Optically Anisotropic Layer]

The optically anisotropic layer contains discotic liquid crystal molecules and a chiral agent. In the optically anisotropic layer provided in an optical compensatory sheet for liquid crystal display of an STN mode, discotic planes of the discotic liquid crystal molecules are oriented essentially vertically to the orientation layer (at an average inclined angle of 50° to 90°) and in twisted alignment by means of the orientation layer and the chiral agent. The discotic liquid crystal molecules are preferably fixed in the optical anisotropic layer to keep the vertical (homogeneous) alignment. The discotic liquid crystal molecules are preferably fixed by a polymerization reaction.

The discotic liquid crystal molecule is described in various documents A(C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula:

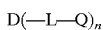

$$D(—L—Q)_n$$

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q). The triphenylene (D4) is particularly preferred.
(D1)
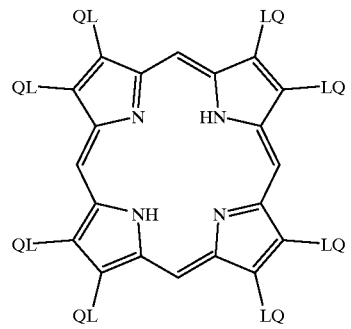
(D2)
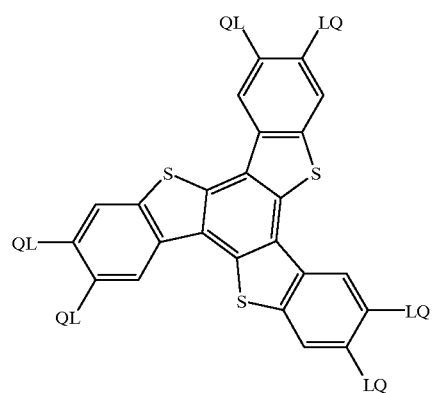
(D3)
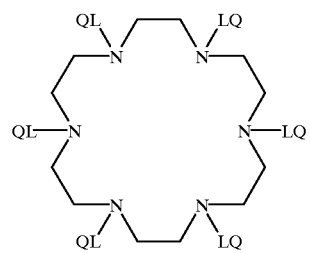
(D4)
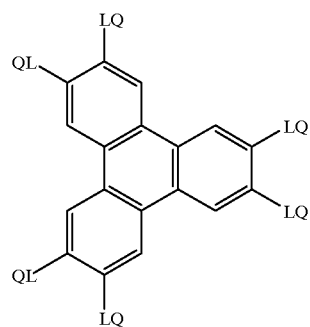
(D5)
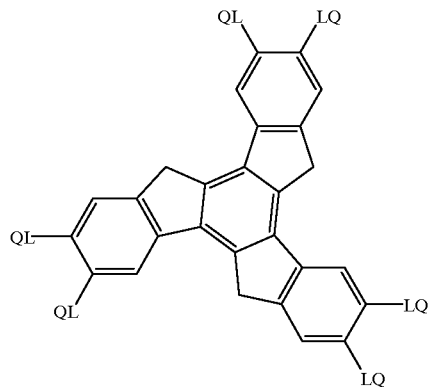
(D6)
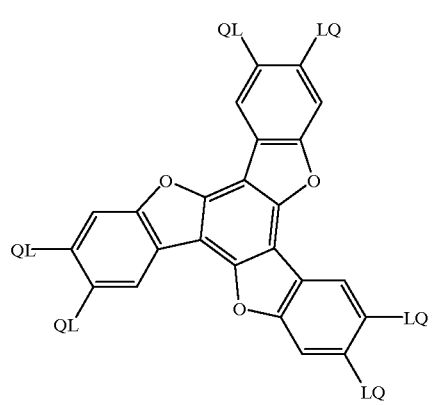
(D7)
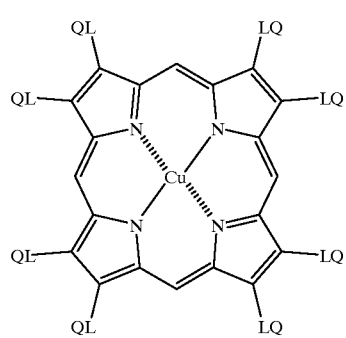
(D8)
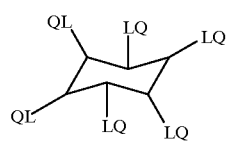

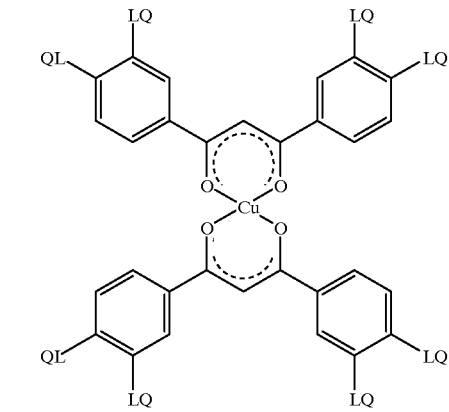
(D9)
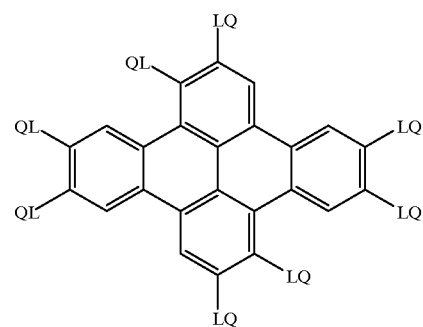
(D10)
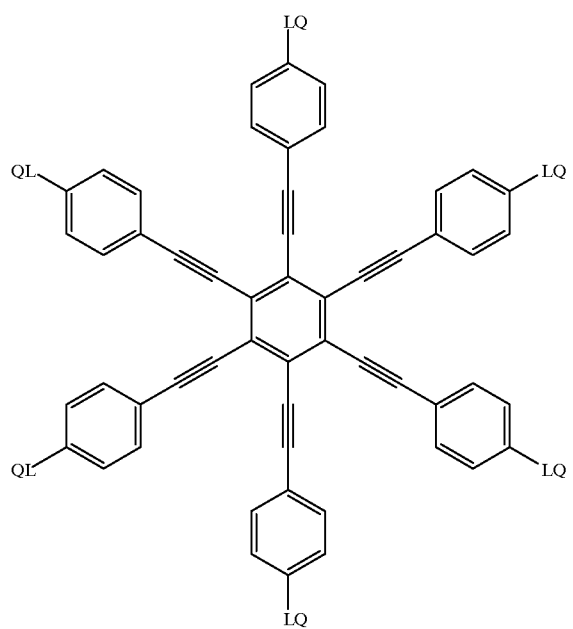
(D11)
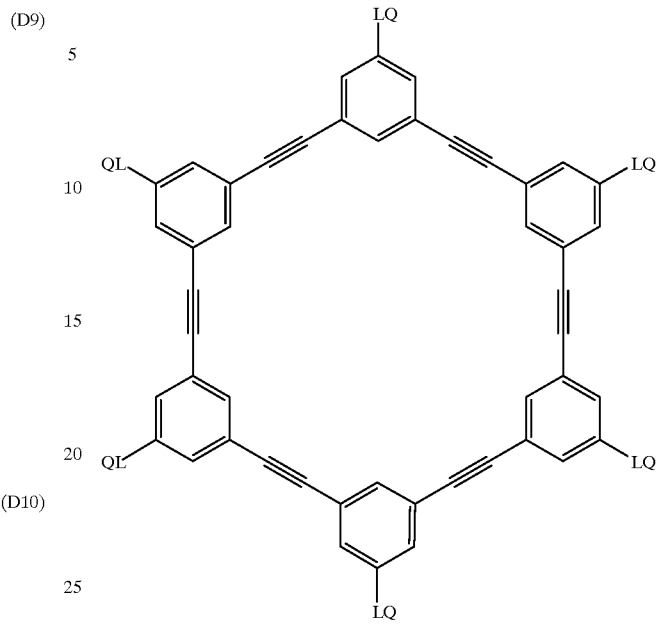
(D12)
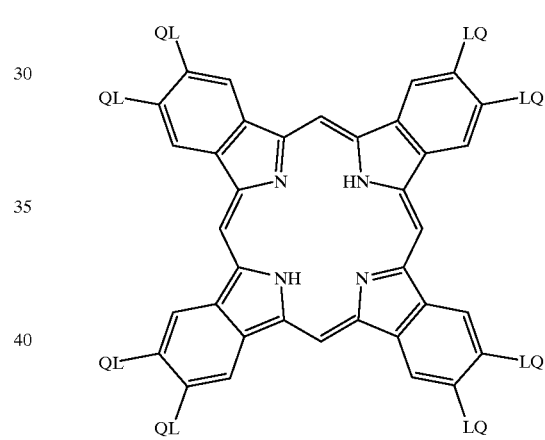
(D13)
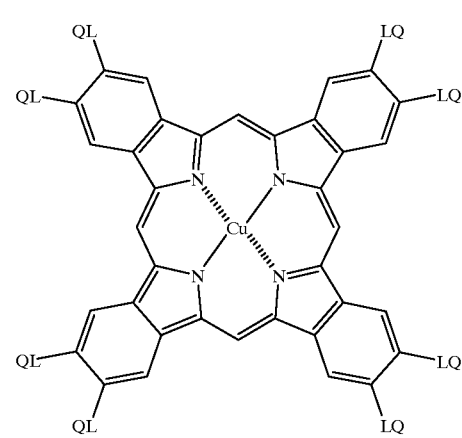
(D14)

-continued (D15)

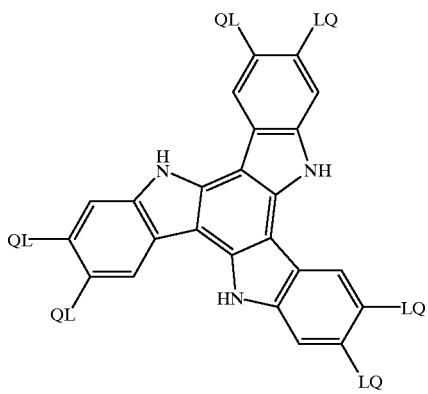

In the formula, the divalent linking group (L) preferably is selected from the group consisting of an alkylene group, an alkenylene group, an arylene group, —CO, —NH—, —O—, —S—and combinations thereof. L more preferably is a divalent linking group comprising at least two divalent groups selected from the group consisting of an alkylene group, an alkenylene group, an arylene group, —CO—, —NH—, —O— and —S—. L further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

L1: —AL—CO—O—AL—
L2: -AL-CO—O—AL—O—
L3: —AL—CO—O—AL—O—AL—
L4: —AL—CO—O—AL—O—CO—
L5: —CO—AR—O—AL—
L6: —CO—AR—O—AL—O
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—CO—
L21: —S—AL—
L22: —S—AL—O—
L23: —S—AL—O—CO—
L24: —S—AL—S—AL—
L25: —S—AR—AL—

The polymerizable group (Q) is determined according to the polymerization reaction. Examples of the polymerizable groups (Q) are shown below.

 (Q1)

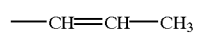 (Q2)

 (Q3)

 (Q4)

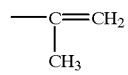 (Q5)

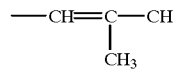 (Q6)

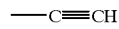 (Q7)

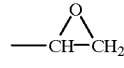 (Q8)

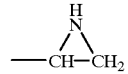 (Q9)

—SH (Q10)

—CHO (Q11)

—OH (Q12)

—CO$_2$H (Q13)

 (Q14)

—NH$_2$ (Q15)

—SO$_3$H (Q16)

 (Q17)

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula, n is an integer of 4 to 12, which is determined according to the chemical structure of the discotic core (D). The 4 to 12 combinations of L and Q can be different from each other. However, the combinations are preferably identical.

Two or more kinds of the discotic liquid crystal molecules can be used in combination. For example, the molecules having a polymerizable group (Q) can be used in combination with those having no polymerizable group (i.e., the molecules having a hydrogen atom in place of the polymerizable group (Q)).

As a chiral agent for orienting the discotic liquid crystal molecules in twisted alignment, the optically anisotropic layer contains an optically active triphenylene compound represented by the formula (I).

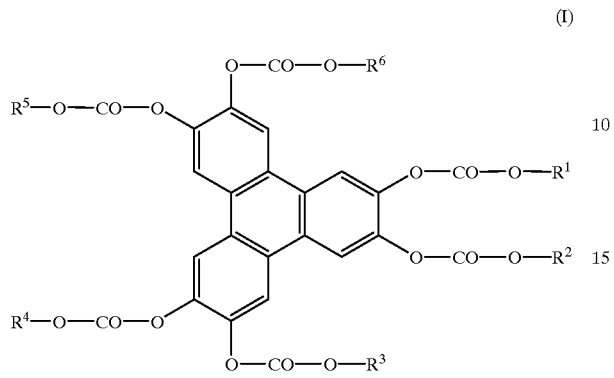

(I)

In the formula (I), each of $R^1$, $R^2$, $R^3$, $R^4$, $R^5$ and $R^6$ is independently an optically active monovalent group. The groups represented by $R^1$, $R^2$, $R^3$, $R^4$, $R^5$ and $R^6$ are preferably identical. The optical activity may be either S or R.

The optical activity is generally caused by an asymmetric carbon atom, an axial asymmetric structure or a planar asymmetric structure. Examples of the axial or planar asymmetric structures include an allene structure, a binaphthyl structure, a helicene structure and a paracyclophane structure. The optical activity is preferably caused by an asymmetric carbon atom.

The monovalent group having an asymmetric carbon is preferably represented by the formula (IR).

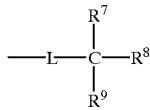

(IR)

In the formula (IR), L is a single bond or a divalent linking group. Preferably, L is a single bond or a divalent linking group selected from the group consisting of -alkylene-, —O— and a combination thereof.

In the formula (IR), each of $R^7$, $R^8$ and $R^9$ is hydrogen, a halogen atom, hydroxyl, cyano, an alkyl group having 1 to 6 carbon atoms, a halogen-substituted alkyl group having 1 to 6 carbon atoms, an aryl group having 6 to 26 carbon atoms, an alkoxy group having 1 to 6 carbon atoms or an acyloxy group having 1 to 6 carbon atoms, provided that $R^7$, $R^8$ and $R^9$ are different from each other or that $R^7$ and $R^8$ are combined to form a ring. The alkyl group, the halogen-substituted alkyl group, the alkoxy group and the acyloxy group may further contain another asymmetric carbon atom. The ring formed by $R^7$ and $R^8$ may further contain another asymmetric carbon atom. Each of $R^7$, $R^8$ and $R^9$ is preferably hydrogen, a halogen atom or an alkyl group having 1 to 6 carbon atoms provided that $R^7$, $R^8$ and $R^9$ are different from each other or that $R^7$ and $R^8$ are combined to form a saturated aliphatic ring.

The optically active triphenylene compound is preferably represented by the formula (II).

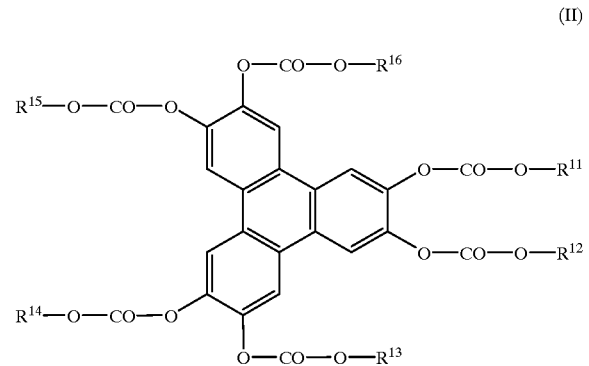

(II)

In the formula (II), each of $R^{11}$, $R^{12}$, $R^{13}$, $R^{14}$, $R^{15}$ and $R^{16}$ is independently an alkyl or cycloalkyl group having 4 to 40 carbon atoms including at least one asymmetric carbon atom. The groups represented by $R^{11}$, $R^{12}$, $R^{13}$, $R^{14}$, $R^{15}$ and $R^{16}$ are preferably identical. The optical activities may be either S or R.

Each of $R^{11}$, $R^{12}$, $R^{13}$, $R^{14}$, $R^{15}$ and $R^{16}$ is preferably represented by the formula (IIR).

(IIR)

In the formula (IIR), L is a single bond or a divalent linking group. Preferably, L is a single bond.

In the formula (IIR), each of $R^{17}$, $R^{18}$ and $R^{19}$ is hydrogen atom or an alkyl group having 1 to 6 carbon atoms provided that $R^{17}$, $R^{18}$ and $R^{19}$ are different from each other or that $R^{17}$ and $R^{18}$ are connected to form a saturated aliphatic ring. The alkyl group may further contain another asymmetric carbon. The saturated aliphatic ring formed by $R^{17}$ and $R^{18}$ may further contain another asymmetric carbon. The saturated aliphatic ring is preferably a cyclohexane ring.

Examples of the optically active triphenylene compounds are shown below. The groups represented by "R" are identical. The definition of R is given below by referring to the number of the examples. The carbon atom (C) marked with asterisk (*) is an asymmetric carbon. The example (43), which has a planar asymmetric structure, has no asymmetric carbon.

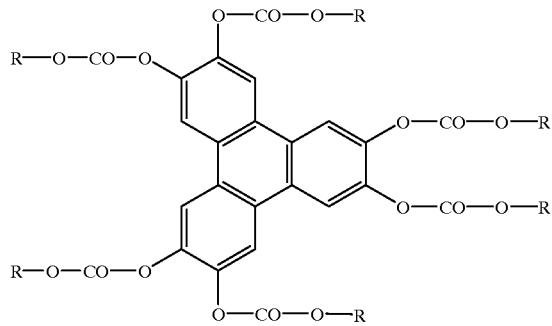

(1) —C*HCH₃—(CH₂)₂—H
(2) —C*HCH₃—(CH₂)₃—H
(3) —C*HCH₃—(CH₂)₄—H
(4) —C*HCH₃—(CH₂)₅—H
(5) —C*HCH₃—(CH₂)₆—H
(6) —C*HCH₃—(CH₂)₇—H
(7) —C*HCH₃—(CH₂)₈—H
(8) —C*HCH₃—CH₂—O—(CH₂)₂—H
(9) —C*HCH₃—CO—O—(CH₂)₃—H
(10) —CH₂—C*HCH₃—(CH₂)₂—H
(11) —CH₂—C*HCH₃—(CH₂)₃—H
(12) —CH₂—C*HCH₃—(CH₂)₄—H
(13) —CH₂—C*HCH₃—(CH₂)₅—H
(14) —CH₂—C*HCH₃—(CH₂)₆—H
(15) —CH₂—C*HCH₃—(CH₂)₇—H
(16) —CH₂—C*HC₂H₅—(CH₂)₃—H
(17) —CH₂—C*HC₂H₅—(CH₂)₄—H
(18) —CH₂—C*HC₃H₇—(CH₂)₄—H
(19) —CH₂—C*HC₂H₅—O—CH₃
(20) —CH₂—C*HC₄H₉—O—CH₃
(21) —CH₂—C*HCH₃—O—(CH₂)₂—H
(22) —CH₂—C*HC₂H₅—O—CO—CH₃
(23) —CH₂—C*HC₄H₉—O—CO—CH₃
(24) —CH₂—C*HF—O—(CH₂)₂—H
(25) —CH₂—C*HF—O—(CH₂)₄—H
(26) —CH₂—C*HCl—O—(CH₂)₂—H
(27) —CH₂—C*HCl—O—(CH₂)₄—H
(28) —CH₂—C*HCN—O—(CH₂)₂—H
(29) —CH₂—C*HCN—O—(CH₂)₄—H
(30) —(CH₂)₂—C*HCH₃—(CH₂)₂—H
(31) —(CH₂)₂—C*HCH₃—(CH₂)₃—H
(32) —(CH₂)₂—C*HCH₃—(CH₂)₄—H
(33) —(CH₂)₂—C*HCH₃—(CH₂)₅—H
(34) —(CH₂)₂—C*HCH₃—(CH₂)₆—H
(35) —(CH₂)₃—C*HCH₃—(CH₂)₂—H
(36) —(CH₂)₃—C*HCH₃—(CH₂)₃—H
(37) —(CH₂)₃—C*HCH₃—(CH₂)₄—H
(38) —(CH₂)₃—C*HCH₃—(CH₂)₅—H
(39) —(CH₂)₄—C*HCH₃—(CH₂)₂—H
(40) —(CH₂)₄—C*HCH₃—(CH₂)₃—H
(41) —(CH₂)₄—C*HCH₃—(CH₂)₄—H

(42) 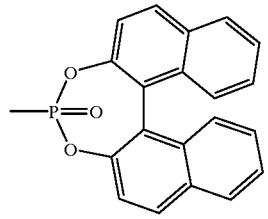

(43)

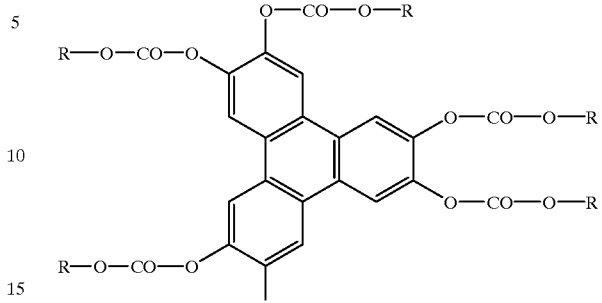

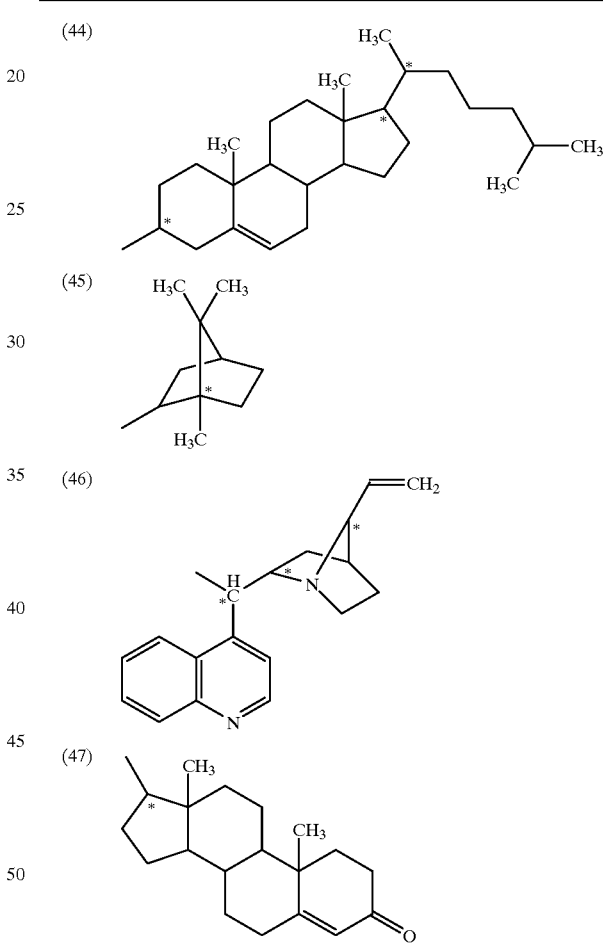

Two or more of the optically active triphenylene compounds can be used as a chiral agent in combination.

The optically active triphenylene compound is preferably used in an amount of 0.01 to 25 wt. %, more preferably 0.1 to 10 wt. % based on the amount of the incorporated discotic liquid crystal molecules.

Synthesis examples of the optically active triphenylene compound are described below. The other compounds can also be prepared in a similar manner.

SYNTHESIS EXAMPLE 1

Synthesis of 2,3,6,7,10,11-hexa-{(s)-2-octyloxycarbonyloxy}triphenylene

NMR (CDCl$_3$/ppm) 0.91 (18H, t), 1.32 (60H, bs), 1.39 (18H, d), 1.72 (6H, m), 1.80 (6H, m), 4.90 (6H, dt), 8.39 (6H, s)

Mass spectra (Fab (pos.)) 1261 (M+H)$^+$ (5)

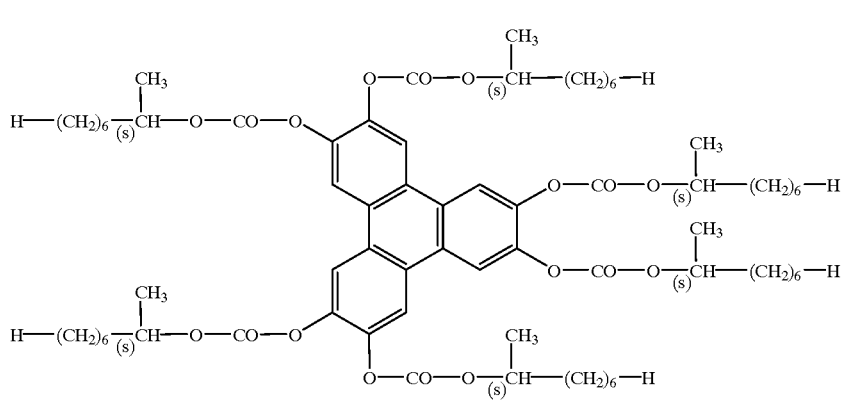

A TFT solution of 4.86 g (15 mmol) of 2,3,6,7,10,11-hexahydroxytriphenylene and 135 mmol of (s)-2-octyl chlorocarbonate was stirred while chilled with ice. After 40 ml of pyridine was slowly and dropwise added, the liquid was heated for 50 minutes to the room temperature. The solution was poured into diluted hydrochloric acid, and the resulting mixture was extracted with ethyl acetate. The organic phase was collected, washed with diluted hydrochloric acid, water and saturated aqueous solution of sodium chloride, and then dried with anhydrous magnesium sulfate. After the solvent was distilled off, the obtained brown oily product (26.2 g) was purified through silica-gel chromatography (hexane:ethyl acetate =10:1) to prepare 13.75 g of the titled optically active triphenylene compound (5) [colorless oily product at room temperature, yield: 69%].

SYNTHESIS EXAMPLE 2

Synthesis of 2,3,6,7,10,11-hexa-[(R)-{2-(s)-isopropyl-5-(R)-methylcyclohexyl}oxycarbonyloxy]triphenylene (42)

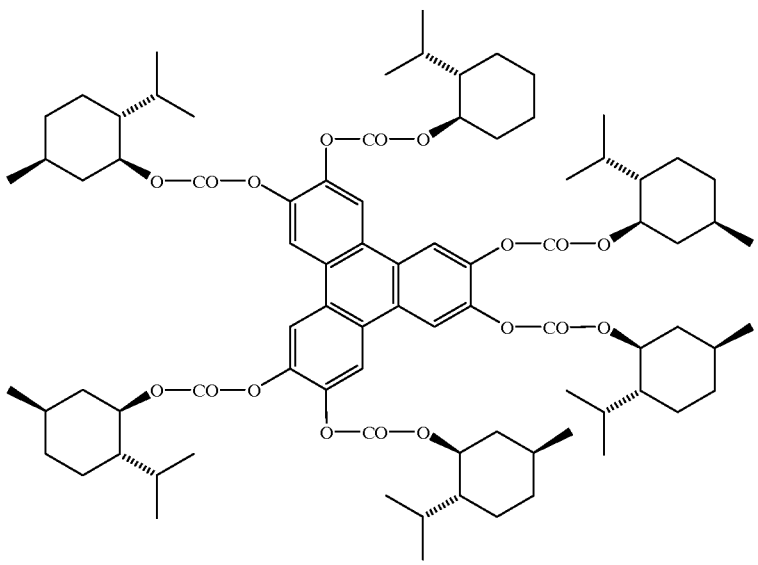

1.62 g (5 mmol) of 2,3,6,7,10,11-hexahydroxytriphenylene was dissolved in 30 ml of DMF, and stirred at room temperature. After 11.0 g (50.3 mmol) of (−)-menthyl chlorocarbonate was dropwise added, the solution was stirred while chilled with ice. While the temperature of the solution was kept below 11° C., 10 ml of pyridine was dropwise added. The resulting solution was stirred at the room temperature, and was left for overnight. The deposited crystalline product was collected by filtration, washed with acetonitrile, and dissolved in a small amount of ethyl acetate. The obtained solution was purified through silica-gel chromatography, and then concentrated. Upon recrystallization from acetonitrile-ethyl acetate, 5.63 g of the titled optically active triphenylene compound (42) was prepared [colorless crystalline product, yield: 79%].

NMR (CDCl$_3$/ppm) 0.89 (18H, t), 0.94 (36H, d), 1.16 (12H, m), 1.50 (12H, bt), 1.55 (6H, bs), 2.01 (6H, m), 2.26 (6H, bd), 4.66 (6H, dt), 8.40 (6H, s)

Mass spectra (Fab (pos.)) 1418 (M+H)$^+$

The optically anisotropic layer can further contain a cellulose ester, which has a function of uniformly and essentially vertically (homogeneously) orienting in monodomain alignment the discotic liquid crystal molecules placed near the interface between the layer and the air.

The cellulose ester preferably is a cellulose ester of a lower fatty acid.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate. Examples of the cellulose esters of the lower fatty acids include cellulose acetate, cellulose propionate, cellulose butyrate, cellulose hydroxypropionate, cellulose acetate propionate and cellulose acetate butyrate. Cellulose acetate butyrate is particularly preferred. Butyric acid content of the cellulose acetate butyrate is preferably not less than 30%, more preferably in the range of 30 to 80%. Acetic acid content of the cellulose acetate butyrate is preferably less than 30%, and more preferably in the range of 1 to 30%.

The coating amount of the cellulose ester is preferably in the range of 0.005 to 0.5 g per m$^2$, more preferably in the range of 0.01 to 0.45 g per m$^2$, further preferably in the range of 0.02 to 0.4 g per m$^2$, and most preferably in the range of 0.03 to 0.35 g per m$^2$. The amount of the cellulose ester is also preferably in the range of 0.1 to 5 wt. % based on the amount of the discotic liquid crystal molecule.

An optically anisotropic layer can be formed by coating an orientation layer with a solution containing the discotic liquid crystal molecule and optional components such as cellulose ester, a polymerization initiator (described below) and other additives.

A solvent for the preparation of the solution preferably is an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as an extrusion coating method, a direct gravure coating method, a reverse gravure coating method, a die coating method or a bar coating method.

The aligned discotic liquid crystal molecules are preferably fixed while the essentially vertical (homogeneous) alignment is maintained. The discotic liquid crystal molecules are fixed preferably by a polymerization reaction of the polymerizable groups (Q) in the molecules. The polymerization reaction can be classified into a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367, 661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046, 127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per cm$^2$, and more preferably in the range of 100 to 800 mJ per cm$^2$. The light irradiation can be conducted while the layer is heated to accelerate the photo polymerization reaction.

The optically anisotropic layer has a thickness preferably in the range of 0.1 to 50 μm, more preferably 1 to 30 μm, and most preferably in the range of 5 to 20 μm. In the case that two optical compensatory sheets are used in a liquid crystal display, the preferred thickness of the layer is half of the preferred thickness in the case that one optical compensatory sheet is used.

The discotic liquid crystal molecules in the optically anisotropic layer are aligned at an average inclined angle in the range of 50° to 90°. The inclined angle is preferably uniform. However, the inclined angle can be continuously changed along the thickness of the optical anisotropic layer.

The twist angle of the discotic liquid crystal molecules is preferably similar to a twist angle of a liquid crystal cell of an STN mode, which is usually in the range of 180° to 360°, and preferably in the range of 180° to 270°. The difference between the twist angles is preferably not larger than 10°. In the case that one optical compensatory sheet is used in a liquid crystal display, the twist angle of the discotic liquid crystal molecules is preferably in the range of 180° to 360°. In the case that two optical compensatory sheets are used in a liquid crystal display, the twist angle of the discotic liquid crystal molecules is preferably in the range of 90° to 180°. In a liquid crystal display of an STN mode, a wavelength dependency of the birefringence (Δn(λ)) of an optically anisotropic layer is preferably similar to a wavelength dependency of the birefringence of a liquid crystal cell of an STN mode.

[Liquid Crystal Display]

The optically anisotropic sheet of the invention is particularly effective as an optical compensatory sheet for a liquid crystal display of an STN mode.

The liquid crystal display of an STN mode comprises a liquid crystal cell of an STN mode, a pair of optical compensatory sheets oriented on both sides of the cell or one optical compensatory sheet oriented on one side of the cell, and a pair of polarizing elements oriented on both sides.

The alignment of rod-like liquid crystal molecules in the liquid crystal cell and that of the discotic liquid crystal molecules in the optical compensatory sheet is preferably so adjusted that a director of rod-like liquid crystal molecules adjacent to the optical compensatory sheet may be the essentially same direction of a director of the discotic liquid crystal molecules adjacent to the liquid crystal cell. The director of the rod-like liquid crystal molecules means the direction of the long axis of the rod-like molecules. The director of the discotic liquid crystal molecules means the direction of a normal line of the discotic core plane. The essentially same direction means that the angle between the directors viewed along a normal line of the liquid crystal cell.

The transparent substrate of the optical compensatory sheet can be used as a protective film of a polarizing plate (on the side facing the liquid crystal cell). In this case, a slow axis (direction showing the maximum refractive index) of the transparent substrate is preferably so oriented that the slow axis may be essentially perpendicular or parallel to the transmission axis (direction showing the maximum transmittance) of the polarizing plate. The term "essentially perpendicular or parallel" means that a margin for error based on the exact angle is in the range of ±10°.

Preliminary Experiment
(Confirmation of Function as Chiral Agent)

The optically active triphenylene compound (42) prepared in Synthesis example 2 and the discotic liquid crystal compound shown below were mixed in each ratio given in Table 1. While the mixture was heated, the transition of liquid crystal phase was observed with a polarizing microscope. Thereby, it was confirmed that the mixture formed chiral nematic (Np*) phase within the temperature range shown in Table 1. In the liquid crystal phase, oily streaks, which characterize chiral nematic (Np*) phase, were observed.

(Discotic liquid crystal compound)

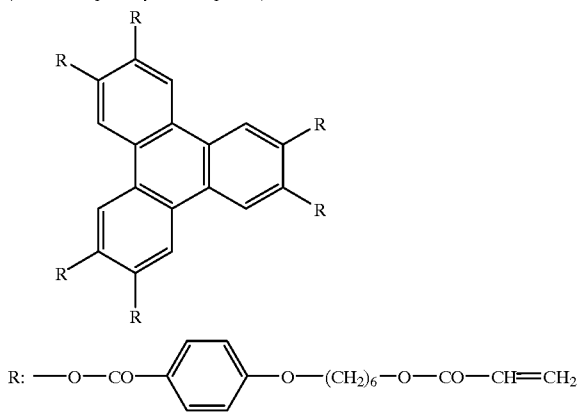

TABLE 1

| Amount of chiral agent | Amount of discotic liquid crystal | Temperature for forming N$_p$* phase |
| --- | --- | --- |
| 2 weight parts | 98 weight parts | 129–186° C. |
| 5 weight parts | 95 weight parts | 117–182° C. |
| 10 weight parts | 90 weight parts | 118–179° C. |
| 80 weight parts | 20 weight parts | 110–167° C. |

EXAMPLE 1
(Production of Optically Anisotropic Sheet)

A triacetyl cellulose film (thickness: 100 μm, Fuji Tac, Fuji Photo Film Co., Ltd.) was used as a transparent substrate.

The polyimide shown below was dissolved in a mixed solvent of N-methyl-2-pyrrolidone, butoxyethanol and methyl ethyl ketone in the amount of 4 wt. %. The prepared solution was applied on the transparent substrate by means of a bar coater of #3. After drying at 140° C. for 2 minutes, the applied solution was further heated at 62° C. for 5 minutes to form an orientation layer of 0.51 μm thickness.

Polyimide

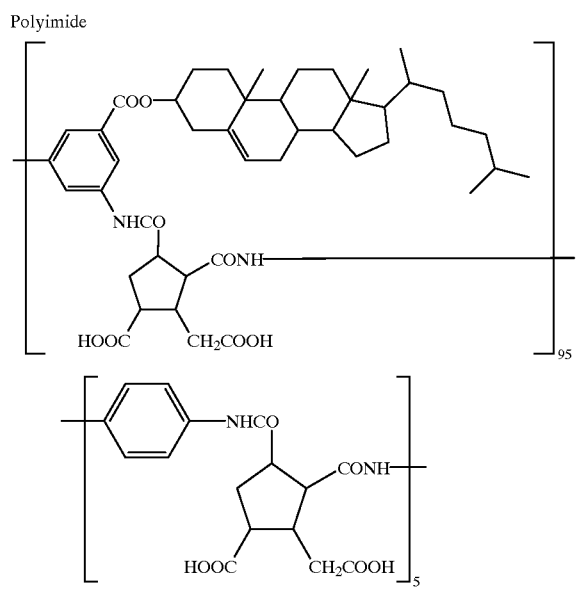

The surface of the orientation layer was subjected to a rubbing treatment, and was coated with the coating solution having the following components by means of a spin coater. After the coating solution applied on the surface was heated at 130° C. for 10 minutes, discotic liquid crystal molecules were aligned.

Coating Solution for Optically Anisotropic Layer

The discotic liquid crystal compound used in Preliminary experiment
  98.5 weight parts
The optically active triphenylene compound (42)
  1.5 weight part
Cellulose acetate butyrate (CAB-551-0.2, Eastman Chemical; acetylation degree: 2.0%; butyrylation degree: 52.0%; number average molecular weight: 30,000)
  0.5 weight part
Ethylene oxide denatured trimethlolpropanetriacrylate (V#360, Osaka Organic Chemicals Co., Ltd.)
  9 weight parts
A photopolymerization initiator (Irgacure 907, Ciba-Geigy)
  3 weight parts
A sensitizer (Kayacure DETX, Nippon Kayaku Co., Ltd.)
  1 weight part
Methyl ethyl ketone
  85 weight parts The coated layer was exposed to ultraviolet light of a metal halide lamp for 5 seconds in the amount of 500 mJ/cm$^2$ while heated at 130° C., to polymerize the terminal vinyl group of the discotic liquid crystal molecule and to fix the alignment. Thus an optically anisotropic sheet was produced. In the optically anisotropic layer of the sheet, the discotic liquid crystal molecules are twisted, and are essentially vertically (homogeneously) aligned.

The Δnd of the produced optically anisotropic sheet was measured at 550 nm, and found 440 nm. The twist angle of the discotic liquid crystal molecules was 120°.

Further, the alignment of the discotic liquid crystal molecules was observed by means of a polarizing microscope, and thereby it was confirmed that all the molecules were uniformly oriented in monodomain alignment.

EXAMPLE 2
(Production of Liquid Crystal Display)

An STN liquid crystal cell (twist angle: 240°, Δnd: 880 nm) was prepared. Independently, two optically anisotropic sheets produced in Example 1 were laminated as optical compensatory sheets, so that their optically anisotropic layer sides might face each other and that the director (direction of a normal line of the discotic core plane) of the discotic liquid crystal molecules in one sheet might be identical with that of the liquid crystal molecules in the other sheet. The thus laminated optical compensatory sheets were provided on the bottom of the STN liquid crystal cell, so that the director of the discotic liquid crystal molecules in the sheets might be oriented at the same direction of the director of the rod-like liquid crystal molecules in the cell along the interface between the cell and the sheets. A pair of polarizing plates were then provided in cross-Nicol, to produce a liquid crystal display of an STN mode.

The produced liquid crystal display was compared with a liquid crystal display having no optical compensatory sheet, and thereby it was confirmed that the optical compensatory sheet remarkably enlarged a viewing angle of the liquid crystal cell.

We claim:

1. An optically anisotropic sheet which comprises a transparent substrate and an optically anisotropic layer, said optically anisotropic layer comprising discotic liquid crystal molecules, and said discotic liquid crystal molecules being oriented in twisted alignment, wherein the optically anisotropic layer further contains an optically active triphenylene compound represented by the formula (I):

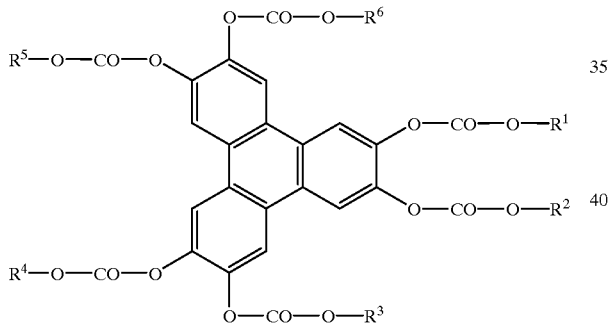

(I)

in which each of $R^1$, $R^2$, $R^3$, $R^4$, $R^5$ and $R^6$ is independently an optically active monovalent group.

2. The optically anisotropic sheet as defined in claim 1, wherein each of $R^1$, $R^2$, $R^3$, $R^4$, $R^5$ and $R^6$ is independently represented by the formula (IR):

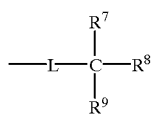

(IR)

in which L is a single bond or a divalent linking group; and each of $R^7$, $R^8$ and $R^9$ is hydrogen, a halogen atom, hydroxyl, cyano, an alkyl group having 1 to 6 carbon atoms, a halogen-substituted alkyl group having 1 to 6 carbon atoms, an aryl group having 6 to 26 carbon atoms, an alkoxy group having 1 to 6 carbon atoms or an acyloxy group having 1 to 6 carbon atoms, provided that $R^7$, $R^8$ and $R^9$ are different from each other or that $R^7$ and $R^8$ are combined to form a ring.

3. The optically anisotropic sheet as defined in claim 2, wherein L is a single bond or a divalent linking group selected from the group consisting of -alkylene-, —O— and a combination thereof.

4. The optically anisotropic sheet as defined in claim 2, wherein each of $R^7$, $R^8$ and $R^9$ is hydrogen, a halogen atom or an alkyl group having 1 to 6 carbon atoms provided that $R^7$, $R^8$ and $R^9$ are different from each other or that $R^7$ and $R^8$ are combined to form a saturated aliphatic ring.

5. The optically anisotropic sheet as defined in claim 1, wherein the optically active triphenylene compound is represented by the formula (II):

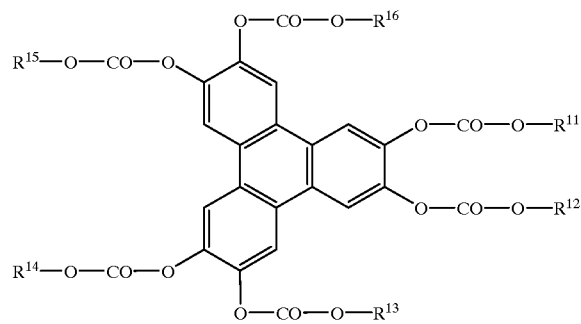

(II)

in which each of $R^{11}$, $R^{12}$, $R^{13}$, $R^{14}$, $R^{15}$ and $R^{16}$ is independently an alkyl group having 4 to 40 carbon atoms or a cycloalkyl group having 4 to 40 carbon atoms, said carbon atoms including at least one asymmetric carbon atom.

6. The optically anisotropic sheet as defined in claim 5, wherein each of $R^{11}$, $R^{12}$, $R^{13}$, $R^{14}$, $R^{15}$ and $R^{16}$ is independently represented by the formula (IIR):

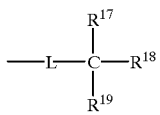

(IIR)

in which L is a single bond or a divalent linking group;
each of $R^{17}$, $R^{18}$ and $R^{19}$ is hydrogen or an alkyl group having 1 to 6 carbon atoms provided that $R^{17}$, $R^{18}$ and $R^{19}$ are different from each other or that $R^{17}$ and $R^{18}$ are combined to form a saturated aliphatic ring.

7. The optically anisotropic sheet as defined in claim 6, wherein L is a single bond.

8. The optically anisotropic sheet as defined in claim 6, wherein each of $R^{17}$, $R^{18}$ and $R^{19}$ is hydrogen or an alkyl group having 1 to 6 carbon atoms provided that $R^{17}$, $R^{18}$ and $R^{19}$ are different from each other or that $R^{17}$ and $R^{18}$ are combined to form a cyclohexane ring.

9. The optically anisotropic sheet as defined in claim 1, wherein said discotic liquid crystal molecules are oriented at an average inclined angle of 50 to 90°, said average inclined angle being an average of angles between discotic planes of said discotic liquid crystal molecules and a surface of said transparent substrate.

10. A liquid crystal display of an STN mode comprising a liquid crystal cell of an STN mode, two polarizing elements placed on both sides of the liquid crystal cell, and one or two optical compensatory sheets placed between the liquid crystal cell and one or both of the polarizing elements, wherein the optical compensatory sheet comprises a transparent substrate and an optically anisotropic layer comprising discotic liquid crystal molecules in this order from the side of the polarizing element, said discotic liquid crystal molecules being oriented in twisted alignment at a twist angle of 90° to 360°, and said optically anisotropic layer further containing an optically active triphenylene compound represented by the formula (I):

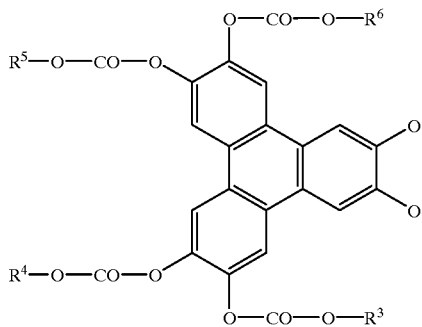
(I)

in which each of $R^1$, $R^2$, $R^3$, $R^4$, $R^5$ and $R^6$ is independently an optically active monovalent group.

11. An optically active triphenylene compound represented by the formula (II):

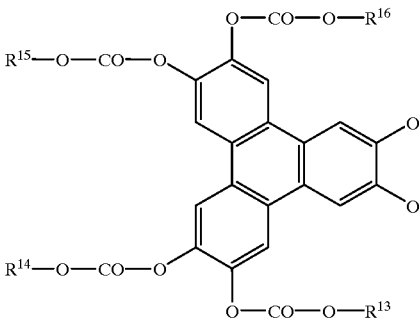
(II)

in which each of $R^{11}$, $R^{12}$, $R^{13}$, $R^{14}$, $R^{15}$ and $R^{16}$ is independently an alkyl group having 4 to 40 carbon atoms or a cycloalkyl group having 4 to 40 carbon atoms, said carbon atoms including at least one asymmetric carbon atom.

12. The optically active triphenylene compound as defined in claim 11, wherein each of $R^{11}$, $R^{12}$, $R^{13}$, $R^{14}$ $R^{15}$ and $R^{16}$ is independently represented by the formula (IIR):

(IIR)

in which L is a single bond or a divalent linking group; each of $R^{17}$, $R^{18}$ and $R^{19}$ is hydrogen or an alkyl group having 1 to 6 carbon atoms provided that $R^{17}$, $R^{18}$ and $R^{19}$ are different from each other or that $R^{17}$ and $R^{18}$ are combined to form a saturated aliphatic ring.

13. The optically active triphenylene compound as defined in claim 12, wherein L is a single bond.

14. The optically active triphenylene compound as defined in claim 12, wherein each of $R^{17}$, $R^{18}$ and $R^{19}$ is hydrogen or an alkyl group having 1 to 6 carbon atoms provided that $R^{17}$, $R^18$ and $R^{19}$ are different from each other or that $R^{17}$ and $R^{18}$ are combined to form a cyclohexane ring.

* * * * *